T & A. Walsh.
Bucket for Dredging-Machine.
N° 73678. Patented Jan. 21, 1868.
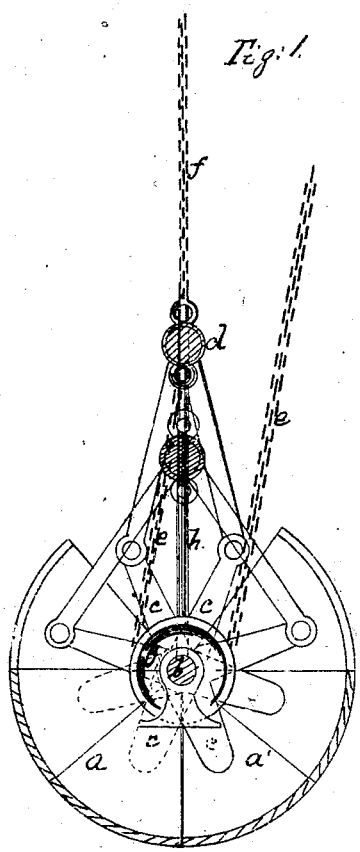
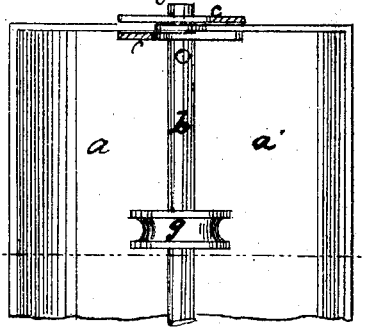
Witnesses.
Theo Tusche
W. Trewn
Inventors.
T Walsh
A Walsh
Per Munn &
Attorneys

United States Patent Office.

THOMAS WALSH AND AUGUSTIN WALSH, OF NEW YORK, N. Y.

Letters Patent No. 73,678, dated January 21, 1868.

---

IMPROVED BUCKETS FOR DREDGING-MACHINES.

---

The Schedule referred to in these Letters Patent and making part of the same.

---

TO ALL WHOM IT MAY CONCERN:

Be it known that we, THOMAS WALSH and AUGUSTIN WALSH, of the city, county, and State of New York, have invented a new and useful Improvement in Operating Buckets for Dredging-Machines; and we do hereby declare that the following is a full, clear, and exact description thereof, which will enable others skilled in the art to make and use the same, reference being had to the accompanying drawings, forming part of this specification.

The present invention relates to a new and easy mode of dumping the contents of buckets of dredging-machines, by means of having the buckets made in the form of a quadrant, with hinged arms attached to them, in such a manner that they can be opened and closed at the pleasure of the operator, in the dredging-vessel; all of which will be understood from the following, reference being had to the accompanying drawings, in which—

Figure 1 represents a section through the line $x\ x$, and

Figure 2 is a plan of the same, with part broken away to show more clearly.

This dredging-bucket is made in the form of a semicircle, and is divided into two parts, $a$ and $a'$, which are hinged together by means of the shaft $b$, which extends lengthwise across the buckets, as clearly shown in fig. 2. $c\ c$ are jointed arms, one of which is secured firmly to each end of the bucket, the shaft $b$ passing through them, thus serving as a fulcrum. The upper joints of these arms are pivoted on the shaft $d$, in the centre of which shaft are two eyes or hooks, to which the chains $e$ and $f$ are attached. These chains run over the crane-arm of the dredging-machine in the usual manner. $g$ is a pulley-wheel, on the centre of the shaft $b$, around which the chain $e$ runs, which is secured to the eye or hook on the under side of the shaft $d$.

When it is desired to dump the load contained in the bucket, the chain $e$ is pulled, which will draw the buckets open, as clearly shown in red outline in the accompanying drawings, fig. 1, and the weight of the buckets will, when the chain $e$ is released, cause themselves to close.

$h\ h$ are two rods, one of which is attached to each end of the shaft $b$. A hole is made in the upper shaft $d$, through which the rod $h$ passes loosely, so as to allow the same to be drawn up and down as the buckets are opened and closed, and thus serve as a stiffening-guide to keep the arms from twisting or being bent from straining.

We claim as new, and desire to secure by Letters Patent—

The arrangement of the jointed levers $c$, shaft $b$, guide-rods $h$, shaft $d$, chain $e$, and buckets $a\ a'$, when the shaft $d$ is adapted to be drawn down to the shaft $b$ by the chain $e$, for opening the buckets, the guide-rods $h$ passing through the shaft $d$, as herein shown and described.

THOMAS WALSH,
AUGUSTIN WALSH.

Witnesses:
WM. F. MCNAMARA,
ALEX. F. ROBERTS.